United States Patent
Acharya et al.

(10) Patent No.: US 9,591,237 B2
(45) Date of Patent: Mar. 7, 2017

(54) AUTOMATED GENERATION OF PANNING SHOTS

(71) Applicant: QUALCOMM Incorporated, San Diego, CA (US)

(72) Inventors: Hemanth Acharya, Bangalore (IN); Pawan Kumar Baheti, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 7 days.

(21) Appl. No.: 14/684,227

(22) Filed: Apr. 10, 2015

(65) Prior Publication Data
US 2016/0301868 A1      Oct. 13, 2016

(51) Int. Cl.
| | |
|---|---|
| H04N 5/262 | (2006.01) |
| H04N 5/232 | (2006.01) |
| H04N 5/272 | (2006.01) |
| G06T 7/20 | (2006.01) |
| H04N 5/14 | (2006.01) |

(52) U.S. Cl.
CPC ....... H04N 5/2625 (2013.01); H04N 5/23229 (2013.01); H04N 5/272 (2013.01); G06T 7/2006 (2013.01); H04N 5/145 (2013.01)

(58) Field of Classification Search
None
See application file for complete search history.

(56) References Cited

U.S. PATENT DOCUMENTS

| | | |
|---|---|---|
| 8,248,480 B2 | 8/2012 | Matsunaga et al. |
| 8,773,548 B2 | 7/2014 | Kobayashi et al. |
| 2006/0007327 A1 | 1/2006 | Nakamura et al. |
| 2008/0309770 A1 | 12/2008 | Florea et al. |
| 2010/0265353 A1* | 10/2010 | Koyama ............ H04N 5/23232 348/222.1 |
| 2012/0242853 A1 | 9/2012 | Jasinski et al. |
| 2014/0146182 A1 | 5/2014 | Endo |
| 2014/0333818 A1 | 11/2014 | Sohn et al. |
| 2015/0002684 A1 | 1/2015 | Kuchiki |
| 2015/0043786 A1* | 2/2015 | Ohki .................. H04N 5/23254 382/107 |

OTHER PUBLICATIONS

International Search Report and Written Opinion—PCT/US2016/023581—ISA/EPO—Jun. 15, 2016.

* cited by examiner

*Primary Examiner* — Justin P Misleh
(74) *Attorney, Agent, or Firm* — Knobbe Martens Olson & Bear, LLP

(57) ABSTRACT

Generally described, aspects of the present disclosure relate to generation of an image representing a panned shot of an object by an image capture device. In one embodiment, a panned shot may be performed on a series of images of a scene. The series of images may include at least subject object moving within the scene. Motion data of the subject object may be captured by comparing the subject object in a second image of the series of images to the subject object in a first image of the series of images. A background image is generated by implementing a blur process using the first image and the second image based on the motion data. A final image is generated by including the image of the subject object in the background image.

24 Claims, 10 Drawing Sheets

AUTOMATED GENERATION OF PANNING SHOTS

BACKGROUND

Field of the Invention

The present application relates generally to generation of panning shots, and more specifically, to systems, methods, and devices for automatically generating a panning shot from multiple images of a subject object moving across a scene.

Description of the Related Art

A panning shot is an image of a subject object in motion. A subject object is any object of interest within a scene captured by an image capture device. Within a panning shot, the subject object is sharp while the background of the scene (for example, aspects of the scene other than the subject object) is blurry. The blur, being in the direction of the subject object, creates a visual effect of motion in the panning shot. Panning shots are typically taken by experienced photographers. For example, a panning shot may be taken by reducing shutter speed/exposure time to a value less than a value calibrated to capture a sharp image of the subject object. In such a situation, optimal exposure time may be difficult to determine due to being a function of the motion of the subject object as well as ambient light. As another example, a panning shot may be taken by moving the image capture device in a same direction of motion as the subject object. However, such a panning shot would require steady hands or a tripod to track the subject object. Also, the movement rate and direction of motion of the image capture device would be controlled to match that of the moving subject object or the panning shot may be excessively blurred. Accordingly, improved systems and methods to facilitate generation of panning shots would be beneficial.

SUMMARY

The systems, methods, and devices of the invention each have several aspects, no single one of which is solely responsible for its desirable attributes. Without limiting the scope of this invention as expressed by the claims which follow, some features of various embodiments will now be discussed briefly. After considering this discussion, and particularly after reading the section entitled "Detailed Description," one will understand how the features of the various embodiments of this invention provide advantages that include more easily, or automatically, generating panning shots. Some embodiments may include additional features, and some embodiments may not include every feature described in the embodiments of the "Summary" section.

One innovation of the subject matter described in the disclosure is a system for generating a panning image. In some embodiments, the system includes a memory component configured to store a series of images of at least two images of a scene. The series of images includes at least one object moving within the scene. The system includes at least one processor in communication with the memory component. The processor is configured to access the series of images stored on the memory component. The processor is further configured to determine a subject object moving in the scene and depicted in the series of images. The processor is further configured to copy image data depicting the subject object from at least one of the series of images. The processor is further configured to determine motion data of the subject object based on the position of the subject object in a second image of the series of images to the position of the subject object in a first image of the series of images. The second image is captured after the first image. The processor is further configured to generate a background image by using the first image, the second image, and the motion data. The processor is further configured to generate a final image by adding the image of the subject object onto the background image.

Another aspect of the subject matter described in the disclosure is a method for generating a panning image. In some embodiments, the method includes receiving a series of images of a scene, the series of images including at least one object moving within the scene and background information. The method further includes copying image data depicting a subject object of the at least one object in motion in the series of images. The method further includes determining motion data of the subject object by comparing a second location of the subject object in a second image of the series of images to a first location of the subject object in a first image of the series of images, the second image captured after the first image. The method further includes generating a background image by using the first image and the second image and the motion data. The method further includes generating a final image by superimposing the image depicting the subject object onto the background image. The method may generate the background image by using the using the first image and the second image and the motion data. To generate the background image, the method may implement a blur process that uses the first image and the second image and the motion data.

Another innovation of the subject matter described in the disclosure is a system for generating a panning image. In some embodiments, the system includes a memory configured to at least store computer-executable instructions. The system further includes a computing device including one or more processors, the computing device in communication with the memory and configured to execute the computer-executable instructions to implement: an image collection module configured to receive a series of images of a scene, the series of images including at least one object moving within the scene. The computing device is further configured to implement a subject object capture module configured to copy image data depicting a subject object selected from the at least one object in motion in the series of images. The computing device is further configured to implement a motion data capture module configured to determine motion data of the subject object by comparing a second position of the subject object in a second image of the series of images to a first position of the subject object in a first image of the series of images, the second image captured after the first image. The computing device is further configured to implement a blur process application module configured to generate a background image using the first image, the second image, and the motion data. The computing device is further configured to implement an image finalization module configured to generate a final image by superimposing the image data depicting the subject object onto the background image.

Another innovation of the subject matter described in the disclosure is a computer-readable, non-transitory storage medium storing computer executable instructions that, when executed by one or more computer systems, configure the one or more computer systems to perform operations for generating a panning image. The operations include receiving a series of images of a scene, the series of images including at least one object moving within the scene and background information. The operations also include copying image data depicting a subject object of the at least one object in motion in the series of images. The operations also include determining motion data of the subject object by comparing the subject object in a second image of the series of images to the subject object in a first image of the series of images, the second image captured after the first image. The operations also include generating a background image by using the first image, the second image, and the motion data. The operations also include generating a final image by superimposing the image data depicting the subject object onto the background image.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
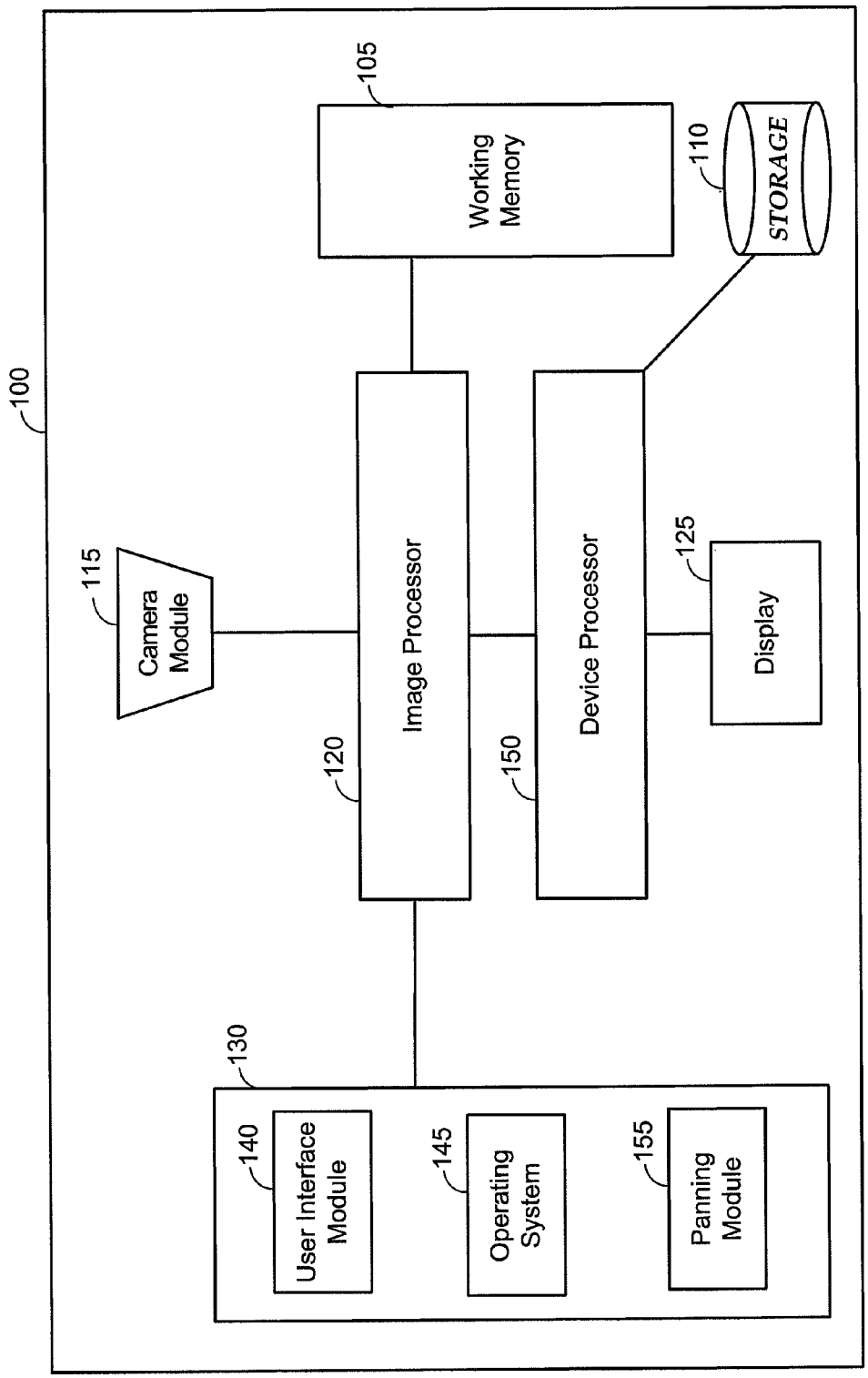
FIG. 1 illustrates a block diagram of an embodiment of an image capture device that may be used for embodiments described herein.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure may be thorough and complete, and may fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure defined by the appended claims and equivalents thereof.

Generally, aspects of this disclosure relate to generating a panning shot by an image capture device. The image capture device may be any device configured to capture visual images of a scene, as will be described below. The panning shot may be automatically generated, using a processor configured with instructions in memory, from a series of images of a subject object moving within a scene. The subject object may be moving in any direction within the scene, including across the scene in any direction, toward the image capture device or away from the image capture device. A panning shot may be done by an experienced photographer who determines exposure time, movement rate and direction of motion of the image capture device based on various factors including ambient light and the motion of the subject object within the scene. However, automated (or substantially automated) generation of a panning shot produces a panning shot with little or no manual adjustment of an image capture device apart from capturing multiple images of the subject object moving within the scene. Automatically generating panning shots would make panning shot creation available to a wider audience of users beyond experienced photographers by reducing the amount of technical skill used for the creation of panning shots. Furthermore, automated (or substantially automated) generation of panning shots may be advantageously applied to integrated image capture devices (including a camera with a processor) which may include processing capabilities along with image capture capabilities to enable creation of panning shots in real time at a same location and/or within a single electronic device. Additionally, automated (or substantially automated) generation of panning shots may also be utilized in consumer electronics devices with greater portability and limited processing power (including a smartphone with a camera) relative to desktop and/or conventional general purpose computing devices by being implemented with specialized hardware configured to perform processes for generating panning shots.

In one embodiment, generating a panning shot may be performed by a system including at least one processor configured to receive a series of images of a scene. The series of images may be a plurality of images captured in adjacent increments of time. The series of images may capture at least one object moving within the scene and background information. The background information may be any information captured from the scene that is not part of the subject object. An object of the plurality of objects moving within the scene may be designated as the subject object and copied from one of the series of images. The designation of the subject object may be made manually (for example, from user input) or automatically (for example, based upon an object detection algorithm), as will be discussed further below. Also, motion data may be determined from at least part of the series of images and define a direction value and a magnitude value. For example, in one embodiment, motion data may be determined from an initial image and a current image of the series of images by comparing the two images. In another embodiment, motion data may be determined from comparing a new current image and a previous "current image" as described in connection with FIGS. 4A-4H). In some embodiments, motion data may be determined from more than two and/or the entire series of images.

A background image may be generated by implementing a blur process using two of the images of the series of images. For example, the background image may be generated by implementing the blur process using the initial image and the current image based upon the motion data determined by comparing the initial image to the current image. In some embodiments, the blur process may be implemented by an overlay process that may include performing computations that represent overlaying the current image on the initial image, and shifting the current image in the direction of the motion data by the magnitude value of the motion data (i.e., mapping pixels of the initial image to pixels in the current image as described in FIGS. 4A-4H). Pixel values of the shifted current image may be added to the initial image to generate pixel values for the background image. The background image may be generated by normalizing the pixel values of the background image (for example, by dividing each of the pixel values by two). In some embodiments, the blur process may be accomplished by using a blur kernel (or function) to blur the initial image, or the current image, in the direction of the motion data by the magnitude value of the motion data, and then using the blurred image to generate the background image. Examples of the blur process are discussed in further detail in connection with FIGS. 4A-4H. Finally, a panning shot may be generated by including an image of the subject object in the background image at a location of the subject object in the current image.

FIG. 1 illustrates a block diagram of an embodiment of an image capture device 100 that may be used to generate an image that appears to have been generated using a manual panning technique, for example, by moving the camera such that an object in the field of view (FOV) of the camera remains at approximately the same location in the FOV, producing an image with a sharp object and a blurred background. The image capture device 100 may include an image processor 120 in communication with a camera module 115. The image processor 120 may also be in communication with a working memory 105, memory 130, and device processor 150, which in turn may be in communication with electronic storage module 110 and an electronic display 125. In some embodiments, a single processor may be used instead of two separate processors. Some embodiments may include three or more processors. In certain embodiments, some of the components described above may not be included in the image capture device 100. In some embodiments, additional components not described above may be included in the image capture device 100. For example, in some embodiments the camera module 115 and/or display 125 may not be included in the image capture device 100, or the working memory 105 and memory 130 may be combined as a single memory component.

The image capture device 100 embodiment illustrated in FIG. 1 may be, or may be part of, a cell phone, digital camera, tablet computer, smart phone, personal digital assistant, or the like. The image capture device 100 may also be a stationary computing device or any device in which automated generation of panning shots would be advantageous. In addition to processes configured to provide automated generation of panning shots, a plurality of processes may be available to the user on the image captured device 100. These processes may include traditional photographic and video capture processes, high dynamic range imaging processes, panoramic photographic capture processes, or stereoscopic imaging processes. As used herein, various embodiments of "automated generation of panning shots" may include various levels of automatic processing, and may include at least one user input, for example, selecting an object and/or selecting a characteristic of a background image. In example of selecting a characteristic of a background image includes selecting the amount of blur in the background image.

The image capture device 100 includes the camera module 115 for capturing external images. The camera module 115 may include various components that are not shown for clarity purposed, including but not limited to a sensor, lens system, and an autofocus assembly. Although a single camera module 115 is illustrated, any number of camera modules and/or camera module components (including sensor or lens system) may be used for the automated panning generation of panning shots as described herein. For example, the number of cameras or optics may be increased to achieve greater depth determining capabilities or better resolution for a given field of view. The camera module 115 may be coupled to the image processor 120 to transmit a captured image to the image processor 120. The image processor 120 or the device processor 150 may be configured to receive the captured image(s) to perform various processes associated with the automated generation of panning shots.

The image processor 120 may be configured to perform various processing operations for the generation of panning shots that are described herein. The image processor 120 may be a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, lens light roll-off or reduction of light level caused by vignette, and the like. Image processor 120 may, in some embodiments, comprise a plurality of processors. For example, each of the plurality of processors may be configured to perform different functions as determined by different modules stored in the memory 130, as will be discussed further below. Image processor 120 may be one or more dedicated image signal processors (ISPs) or a software implementation of a processor.

Still referring to the embodiment illustrated in FIG. 1, as shown, the image processor 120 is connected to a memory 130 and a working memory 105. The memory 130 may contain computer program instructions (grouped as modules in some embodiments) that the image processor 120 executes in order to implement various functionality. The memory 120 may include RAM, ROM and/or other persistent, auxiliary or non-transitory computer-readable media. The memory 130 may store an operating system module 145 that provides computer program instructions for use by the image processor 120 and/or the device processor 150 in the general administration and operation of the image capture device 100. For example, the operating system module 145 may configure the image processor 120 to manage the working memory 105 and the processing resources of device 100. Also, the operating system module 145 may include device drivers to manage hardware resources, for example the camera module 115. Therefore, in some embodiments, instructions contained in the image processing modules discussed above may not interact with these hardware resources directly, but instead interact through standard subroutines or APIs located in the operating system module 145. Instructions within the operating system module 145 may then interact directly with these hardware components. The operating system module 145 may further configure the image processor 120 to share information with device processor 150.

The memory 130 may further include computer program instructions and other information for implementing aspects of the present disclosure. For example, in one embodiment, the memory 130 includes a user interface module 140 that generates user interfaces (and/or instructions therefor) for presentation on the display 125. The memory 130 may also store a palming module 155. The panning module 155 may include additional modules including an image collection module, subject object capture module, motion data capture module, blur process application module and an image finalization module as will be discussed in reference to FIG. 5. Additional modules may be included in some embodiments, or fewer modules may be included in certain embodiments. Working memory 105 may be used by image processor 120 to store a working set of processor instructions contained in the modules of memory 130. Working memory 105 may also be used by image processor 120 to store dynamic data created during the operation of the image capture device 100 (e.g., information used for automated generation of panning shots). Additional modules or connections to external devices or hardware may not be shown in this figure but may exist to provide other operations related to generating panning shots.

Device processor 150 may be configured to control the display 125 to display an image as processed by the image capture device (for example, a panning shot) to a user. The display 125 may be external to the image capture device 100 or may be part of the image capture device 100. The display 125 may also be configured to display a captured image stored in memory or recently captured by the user for user input (for example, for the selection of a subject object from among multiple objects within a scene). The display 125 may include a panel display, for example, a LCD screen, LED screen, or other display technologies, and may implement touch sensitive technologies. The device processor 150 may also be configured to receive an input from the user. For example, the display 125 may also be configured to be a touchscreen, and thus may be configured to receive an input from the user. The user may use the display 125 to input information that the processor may use to generate a panning shot. For example, the user may use the touchscreen to select a subject object from the field of view shown on the display 125.

Device processor 150 may write data to storage component 110, for example data representing captured images. While storage component 110 is represented graphically as a traditional disk device, those with skill in the art would understand that the storage component 110 may be configured as any storage media device. For example, the storage component 110 may include a disk drive, for example a floppy disk drive, hard disk drive, optical disk drive or magneto-optical disk drive, or a solid state memory such as a FLASH memory, RAM, ROM, and/or EEPROM. The storage component 11Q can also include multiple memory units, and any one of the memory units may be configured to be within the image capture device 100, or may be external to the image capture device 100. The storage component 110 may also include memory cards or high speed memories configured to store captured images which may be removable from the camera.

Although FIG. 1 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 1 illustrates a number of memory components, including memory component 130 comprising several modules and a separate working memory 105, one with skill in the art would recognize several embodiments using different memory architectures. For example, a design may use ROM or static RAM memory for the storage of processor instructions implementing the modules contained in memory 130. The processor instructions may be loaded into RAM to facilitate execution by the image processor 120. For example, working memory 105 may comprise RAM memory, with instructions loaded into working memory 105 before execution by the image processor 120.

Figure 2A:
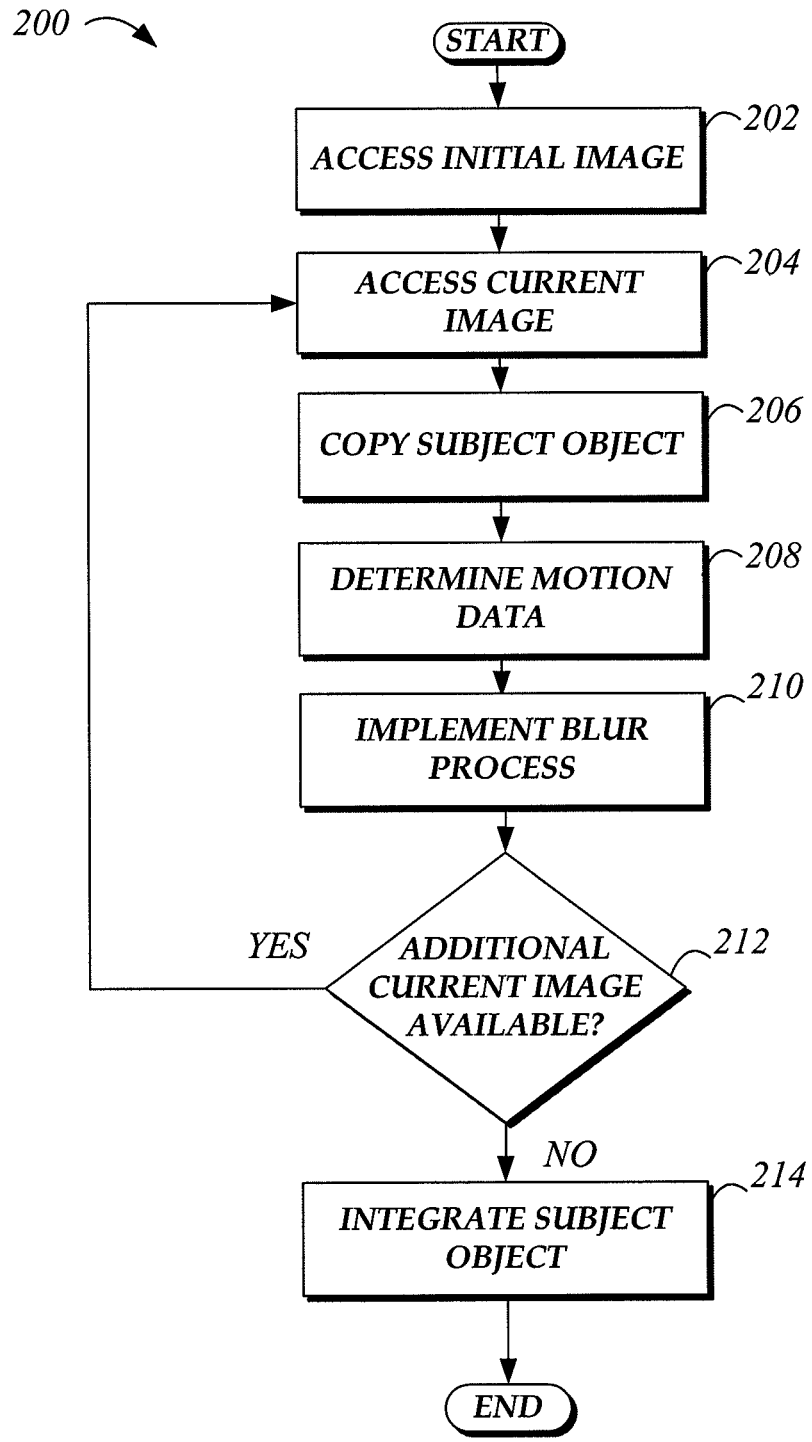
FIG. 2A is a flow chart illustrating an exemplary method, that may be utilized in the image capture device of FIG. 1, for generating images that represent a panning shot.

FIG. 2A illustrates a flow chart of an example of a process 200 for generating a panning shot using a series of images. The process 200 may be incorporated in panning module 155 in FIG. 1 according to some embodiments. The process 200 may start at block 202.

At block 202, the process 200 may access an image which may be referred to as the "initial image." The initial image may be a first image of a series of images captured by the image capture device 100.

At block 204, the process 200 may access an image which may be referred to as the "current image." The current image may be any image that is captured after the initial image is captured, for example the next (consecutive) image in the series of images after the initial image. In some processes, the current image is several images subsequent to the initial image (in the series of images), which may allow a subject object to move a (desired) distance from its position depicted in the initial image.

At block 206, the process 200 may store a portion of the current image depicting the subject object, for example, in the working memory 105 (FIG. 1). The subject object may be identified from the current image and/or the initial image automatically without user input. In some embodiments, the subject object may be manually identified based on user input as discussed in further detail in connection with FIG. 3B. For example, the subject object may be identified automatically by processing a series of images to identify an object depicted in the images that satisfies a certain criteria. This criteria may include, but is not limited to, being in focus across a number of images, being of a certain shape, size and/or color, being in a certain region of an initial image, or featuring a particular mark.

At block 208, the process 200 may determine motion data related to the subject object. In some embodiments, motion data may be determined based upon an analysis of the differences between different images of the series of images, for example, the difference in the position of the subject object in the current image and the initial image, or the position of the subject object as depicted in more than two images of the series of images, as discussed in further detail in reference to FIGS. 4A-4H. The motion data may include a direction value and a magnitude value. The direction value may designate a direction of movement of the subject object between the initial image and the current image (or a direction of motion between the new current image and the previous current image as described in reference to FIGS. 4A-4H). The magnitude value may represent the amount of movement of the subject object between the initial image and the current image.

At block 210, the process 200 may perform a blur process based upon the determined motion data. In certain embodiments, the blur process may be performed using the first image, the second image and the motion data as discussed in further detail in reference to FIGS. 4A-4H.

At block 212, process 200 determines if an additional current image is available, in the series of images, to be used to generate the panning shot. If there is an additional current image available, then the process 200 returns to block 204. Also, the background image generated after the blur process (block 210) is designated as a new initial image and the additional current image is accessed as a new current image. If there is no additional current image, the process 100 proceeds to block 214. Because there may not be significant benefit from using all the images (for example, 30 images) compared to using three images, in various embodiments there can be a value for the maximum number of images used, which may be either user set, set as a default, and/or dynamically set.

At block 214, the process 200 generates a panning shot by combining the subject object with the background image generated from the blur process (block 210). In some embodiments, the subject object may be combined by retrieving the subject object (saved in the working memory 105) and placing the subject object into the image generated from the blur process (block 210). For example, pixels of the subject object replace certain pixels of the image generated from the blur process. The location of the added subject object may be the location that corresponds to the location of the subject object in the current image (for example, the last known location of the subject object within the series of images).

Figure 2B:
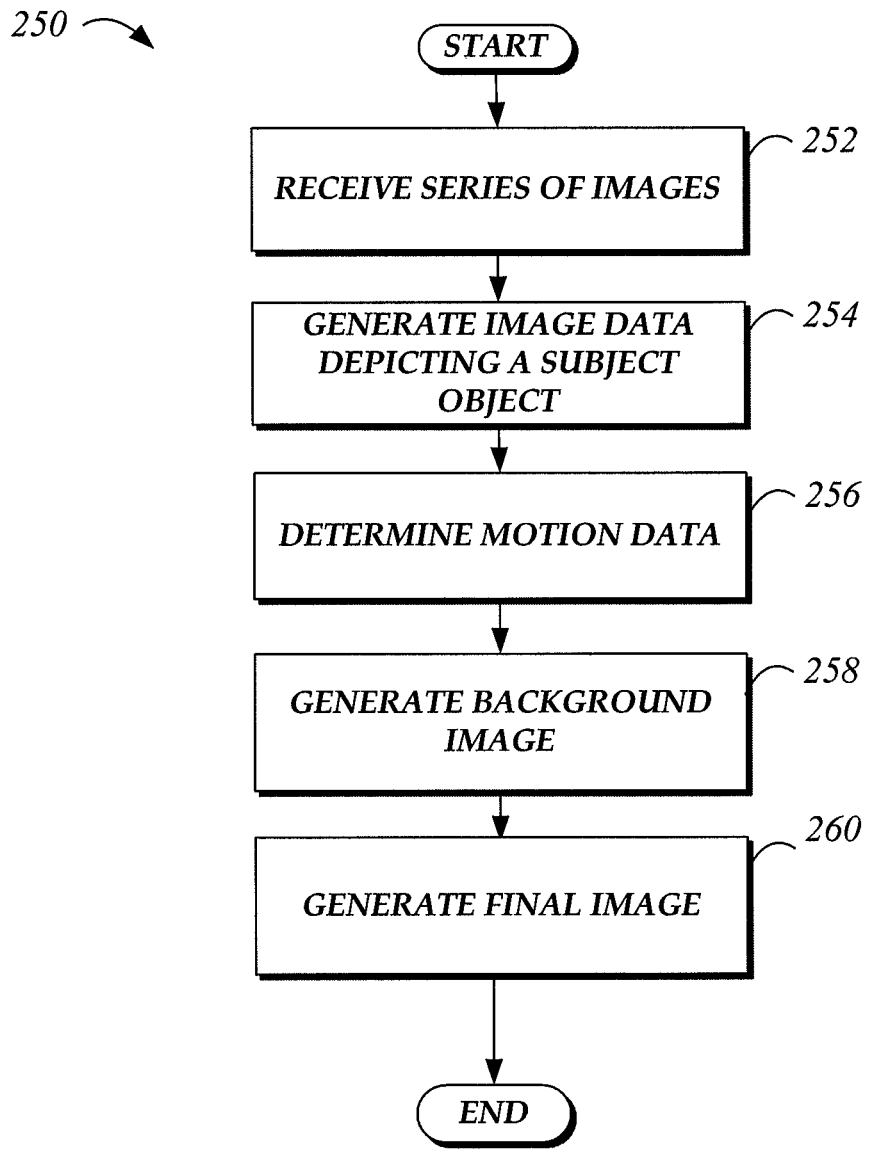
FIG. 2B is a flow chart illustrating an exemplary method for generating an image that represents a panning shot using a first image and a second image, and that may be utilized in the image capture device of FIG. 1.

FIG. 2B illustrates a flow chart of an example of a process 250 for generating a panning shot from a first image and a second image, according to some embodiments. This may be done, for example, by the panning module 155 (FIG. 1). The process 250 may start at block 252.

At block 252, the process 250 receives or accesses the series of images of a scene. The series of images may include at least one object moving within the scene and background information. The background information may be information that is not related to the moving object.

At block 254, the process 250 generates image data depicting a subject object of the at least one object in motion in the series of images. The image data may be generated by copying image data from one of the images of the series of images.

At block 256, the process 250 determines motion data. The motion data is based on the movement of the subject object as depicted in the series of images. The scene may include a first image and a second image captured after the first image. The motion data may be determined by comparing a second location of the subject object in a second image of the series of images to a first location of the subject object in a first image of the series of images.

At block 258, the process 250 generates a background image. The background image may be generated by implementing a blur process using the first image, the second image and the motion data. The blur process may be performed as discussed in further detail in connection with FIGS. 4A-4H.

At block 260, the process 250 generates a final image. The final image may be generated by including the image data depicting the subject object in the background image. The image data may be included at a location that corresponds to the location of the subject object in the second (or final) image.

Figure 3A:
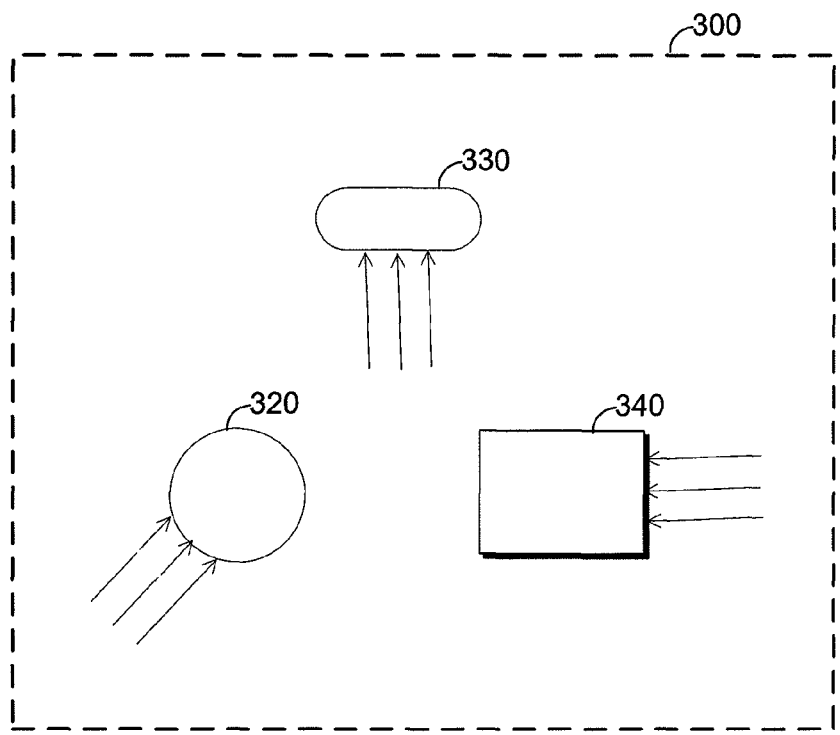
FIGS. 3A-3B illustrate an example of a scene with multiple objects in motion that captured by an image by an image capture device (for example, of FIG. 1).

FIG. 3A illustrates a scene 300 with multiple objects in motion that may be captured by the image capture device of FIG. 1. The objects include a circle 320, rectangle 340 and an oval 330 moving in different directions within the scene (as indicated with the arrows following the various objects).

Figure 3B:
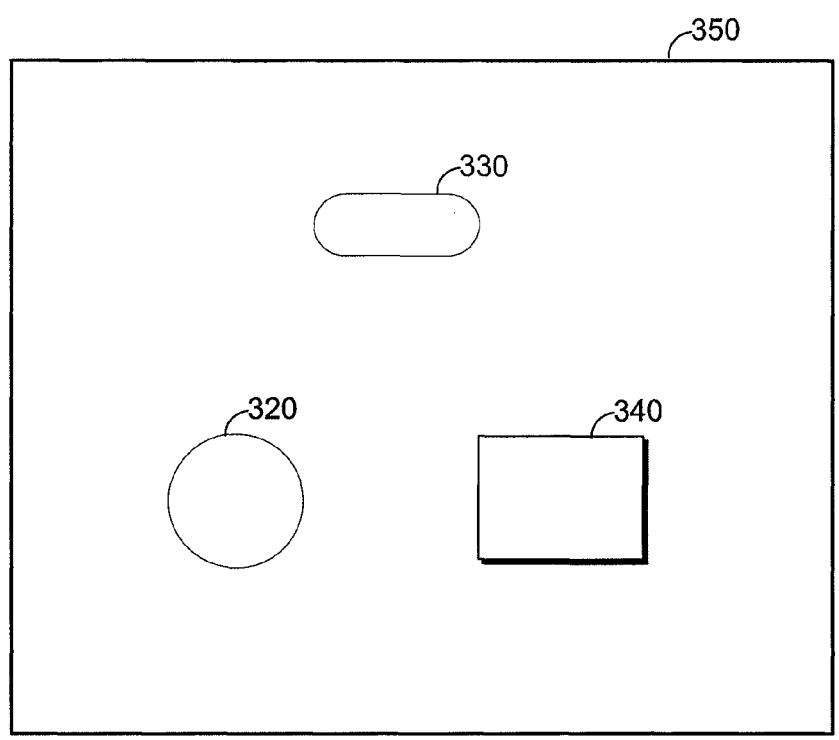

FIG. 3B illustrates an image 350 of the scene 300 of FIG. 3A. The image 350 includes each of the circle 320, rectangle 340 and oval 330. In certain embodiments, the image 350 may be used for processes related to the generation of panning shots. For example, the image 350 may be used to determine the subject object within the scene 300. In certain embodiments, the subject object may be determined by a user input, for example by a user selection of the subject object from among objects within the image 350. The image capture device 100 may be configured to receive user input from the display 125 (FIG. 1), for example, where a user may directly select the object of interest on the display 125 (where the display 125 includes touchscreen capabilities). The image capture device 100 may also be configured to facilitate user input by providing a cursor for a user to select the object of interest from a displayed image. In certain embodiments, the image used for the determination of the subject object may be referred to as a reference image. In some embodiments, the image capture device 100 may be configured to determine the subject object automatically without user input. For example, the image capture device may determine the subject object based upon satisfying certain criteria. This criteria may include (but is not limited to) being in focus across a number of images, being of a certain shape, size or color, being in a certain region of an initial image, or featuring a particular mark.

Figure 4A:
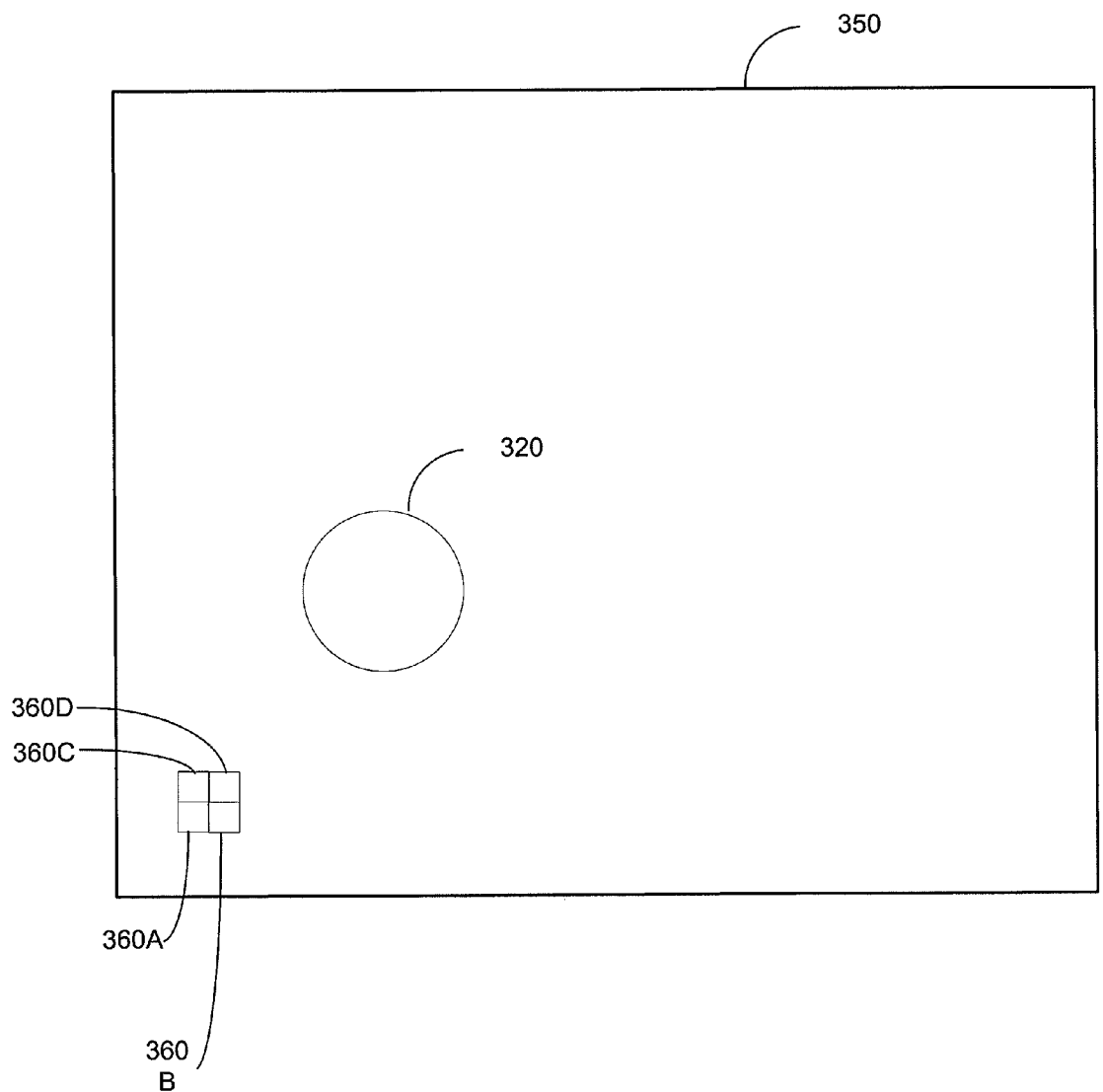
FIGS. 4A-4H illustrate a blur process implemented across a series of images of the scene of FIG. 3A to produce a panning shot.
Figure 4B:
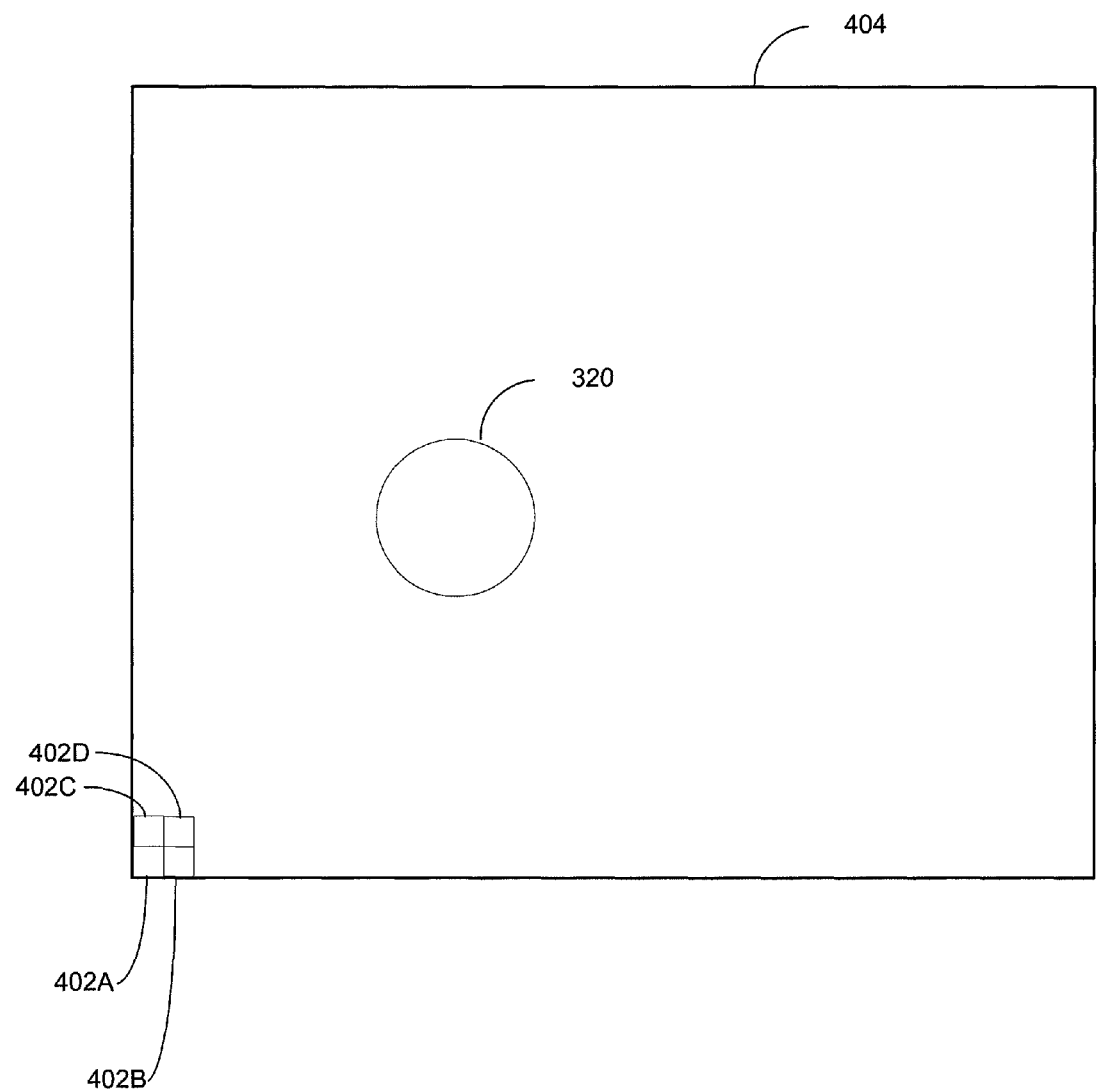
Figure 4C:
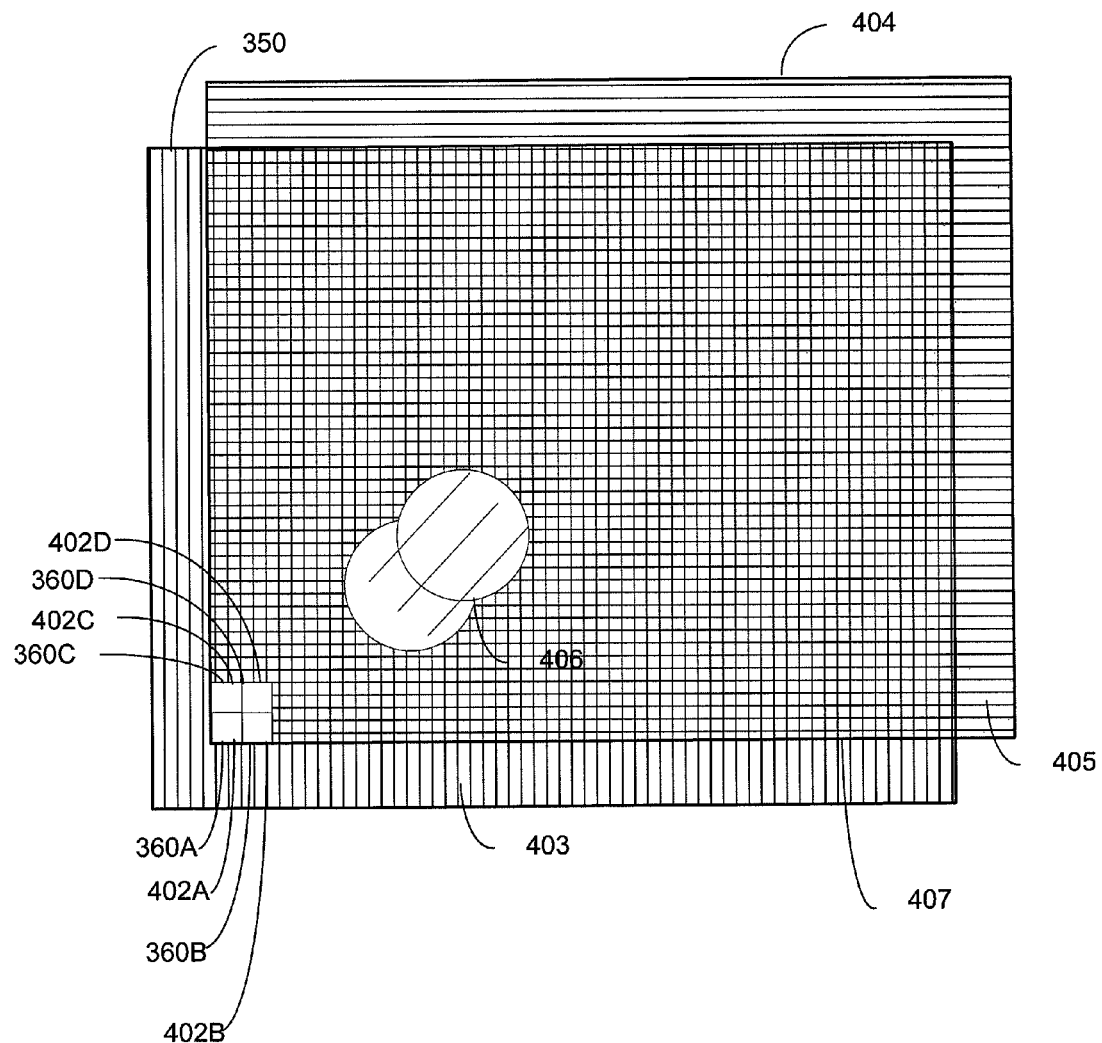

FIGS. 4A-4H illustrates aspects of some embodiments of a blur process. The blur process may be performed across a series of images of the scene 300 (FIG. 3A) to produce a panning shot. As illustrated in FIG. 4A, the circle 320 of the image 350 may be selected as the subject object. The image 350 may be designated as the initial image in a series of images depicting the subject object and will be referred to as the initial image 350 in the remaining description of FIGS. 4A-4H. Referring to FIG. 4B, the next image in the series of images of the scene 300 is designated as the current image 404. Motion data that characterizes the direction of motion and the magnitude of motion can be determined based upon the differences between the initial image 350 and the current image 404. For example, the motion data may be determined by characterizing the amount of movement that the subject object 320 has made between the initial image 350 and the current image 404 (or differences between the new current image and the previous current image as described below). FIG. 4C illustrates the initial image 350 as having vertical lines and the current image 404 has having horizontal lines for clarity.

As illustrated in FIG. 4A-4C, the current image 404 may be overlaid and shifted relative to the initial image 350 in a magnitude and direction as dictated by the motion data. Overlaying refers to mapping each pixel at each location of one image to another pixel of another image. Shifting refers to mapping each pixel at each location of one image to another pixel of another image at a different location. For example, pixels 360A, 360B, 360C and 360D in the initial image 350 of FIG. 4A may be mapped to pixels 402A, 402B, 402C, and 402D in the current image 404 of FIG. 4B. Therefore, pixels 360A, 360B, 360C and 360D in the initial image 350 of FIG. 4A are overlaid by pixels 402A, 402B, 402C, and 402D in the current image 404 of FIG. 4B. Also, pixels 360A, 360B, 360C and 360D in the initial image 350 of FIG. 4A may be at locations offset from locations of pixels 402A, 402B, 402C, and 402D in the current image 404 of FIG. 4/3 by a magnitude and direction as determined from the motion data. Thus, each of the pixels are shifted as pixels 360A, 360B, 360C and 360D in the initial image 350 of FIG. 4A are overlaid in different locations relative to the locations of 402A, 402B, 402C, and 402D in the current image 404 of FIG. 4B.

Furthermore, as illustrated in FIG. 4C, a background image 407 may be generated by adding the overlaid and shifted images. The background image is illustrated in FIG. 4C as having horizontal and vertical lines for clarity. Adding refers to adding the overlaid and shifted pixel values of each image to each other. For example, if each of pixels 360A, 360B, 360C and 360D has a pixel value of 40 and each of pixels 402A, 402B, 402C, and 402D has a pixel value of 60, adding the pixel values results in pixel values of 100 at each pixel corresponding to a non-normalized background image. These added pixel values would be at pixel locations where pixel data exists in the image 35Q and the image 404. In other words, where images 350 and 404 overlap. A background image 407 may be generated as a collection of pixel values at locations corresponding to the overlap of images 350 and 404.

The background image 407 may be finalized by normalizing the background image. Normalizing refers to dividing the added pixel values by two and scaling the added pixels to the standard dimensions of the images in the series of images to result in the background image. As illustrated in FIG. 4C, the background image 407 produces a blurred subject object 406 but also loses resolution as certain areas of the initial image 350 and the current image 404 may not overlap. Stated another way, resolution may be lost due to a null value resulting where a pixel of the current image 404 does not have a corresponding pixel of the initial image 350 or where a pixel of the initial image 350 does not have a corresponding pixel of the current image 404 (for example, in region 403 of the initial image 350 or in region 405 of the current image 404). The added pixel values may be normalized by dividing the added pixel values by two and being scaled up in resolution to the standard dimensions of the images in the series of images. The scaled background image 407 may be the finalized background image 407 used as a new initial image 406 in FIG. 4E.

Figure 4D:
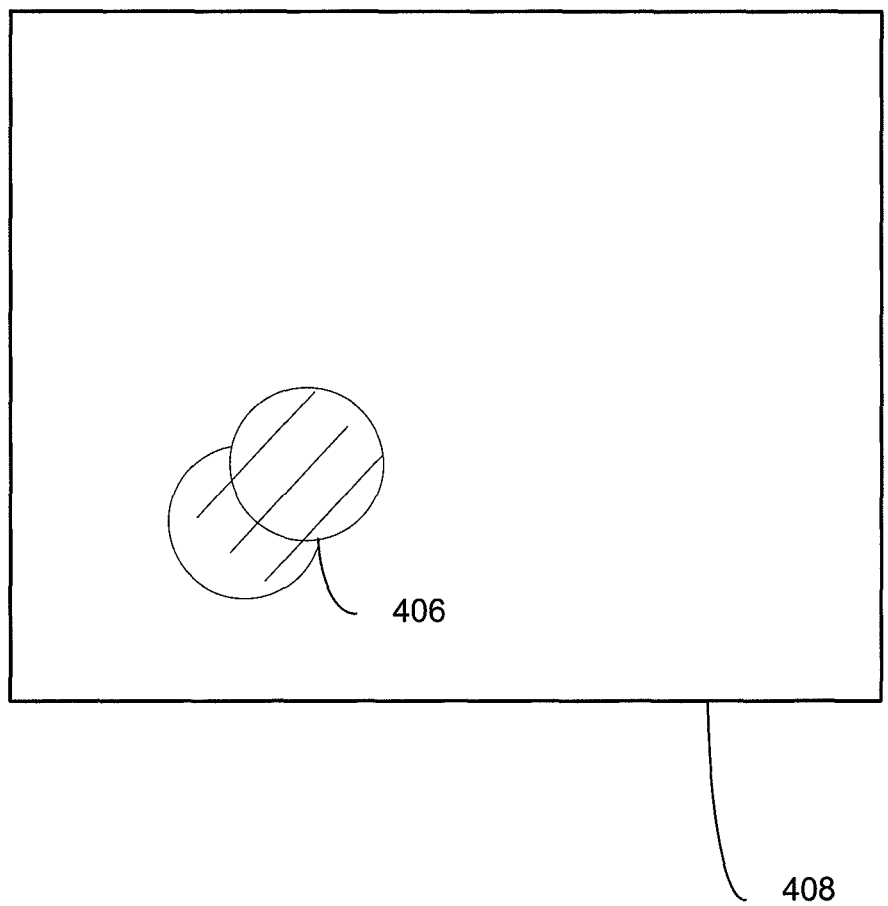
Figure 4E:
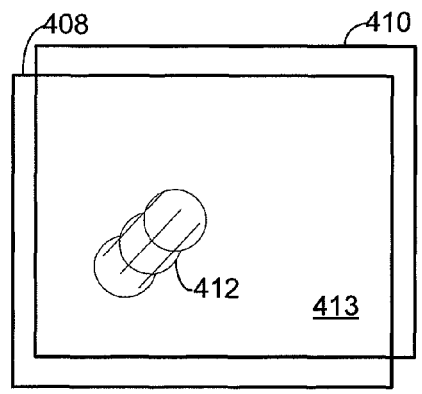

In FIG. 4E, the finalized background image illustrated in FIG. 4D is designated as the new initial image 408 and the next image in the series of images of the scene is designated as the new current image 408. Motion data that characterizes the direction of motion and the magnitude of motion is determined based upon the differences between the previous current image 404 and the new current image 410, as discussed in connection with block 208 of FIG. 2. The previous current image is the image previously used as the current image when the new current image is used. Then the new current image 410 is overlaid over the new initial image 408 and shifted in a magnitude and direction as dictated by the motion data. The pixel values of the overlaid new initial image 408 and new current image 410 are added to generate a background image 413. This background image 413 is then normalized to produce a finalized background image used as a new initial image 414 in FIG. 4D.

Figure 4F:
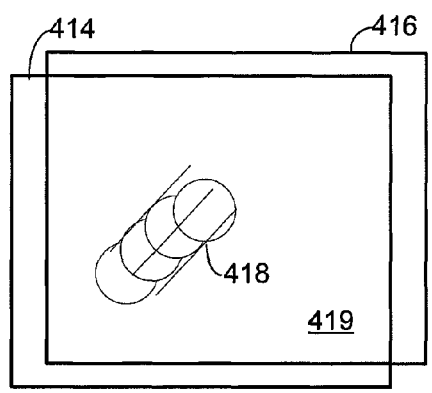

In FIG. 4F, the background image generated in FIG. 4C is designated as the new initial image 414 and the next image in the series of images of the scene is designated as the new current image 416. Motion data that characterizes the direction of motion and the magnitude of motion is determined based upon the differences between the previous current image 410 and the new current image 416, as discussed in connection with block 208 of FIG. 2. Then the new current image 416 is overlaid over the new initial image 414 and shifted in a magnitude and direction as dictated by the motion data. The pixel values of the overlaid new initial image 414 and new current image 416 are added to generate a background image 419. This background image 419 is then normalized to result in a finalized background image that is used as a new initial image 420 in FIG. 4E.

Figure 4G:
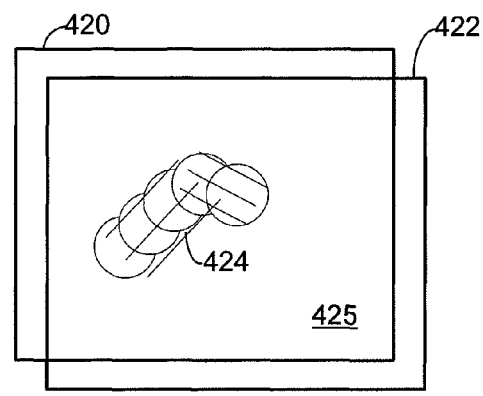

In FIG. 4G, the background image 419 illustrated as being generated in FIG. 4D is designated as the new initial image 420 and the next image in the series of images of the scene is designated as the new current image 422. Motion data that characterizes the direction of motion and the magnitude of motion is determined based upon the differences between the previous current image 416 and the new current image 422, as discussed in connection with block 208 of FIG. 2. Then the new current image 422 is overlaid over the new initial image 420 and shifted in a magnitude and direction as dictated by the motion data. The pixel values of the overlaid new initial image 420 and new current image 422 are added to generate a new background image 425. This background image 425 is then normalized to result in a finalized background image that is used as a new initial image 426 in FIG. 4E.

Figure 4H:
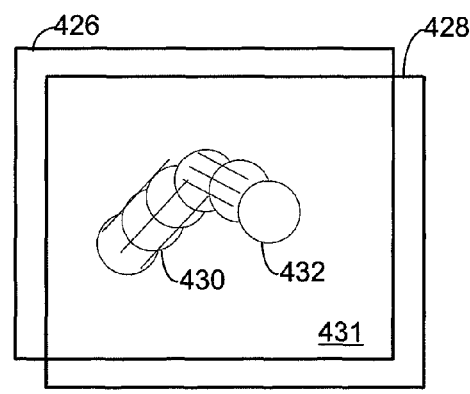

In FIG. 4H, the background image 425 illustrated as being generated in FIG. 4E is designated as the new initial image 426 and the next image in the series of images of the scene is designated as the new current image 428. Since this new current image 428 is the last image of the series of images, the subject object within the new current image 428 is extracted for use after the background image is generated. Motion data that characterizes the direction of motion and the magnitude of motion is determined based upon the differences between the previous current image 422 and the new current image 428, as discussed in connection with block 208 of FIG. 2. Then the new current image 428 is overlaid over the new initial image 426 and shifted in a magnitude and direction as dictated by the motion data. The pixel values of the overlaid new initial image 426 and new current image 428 are added and then normalized to generate a background image 431. This background image 431 is then scaled up in resolution to the standard size of the images in the series of images and the crisp image of the subject object is overlaid over the last position of the subject object in the new current image 428 to produce the panning shot.

Figure 5:
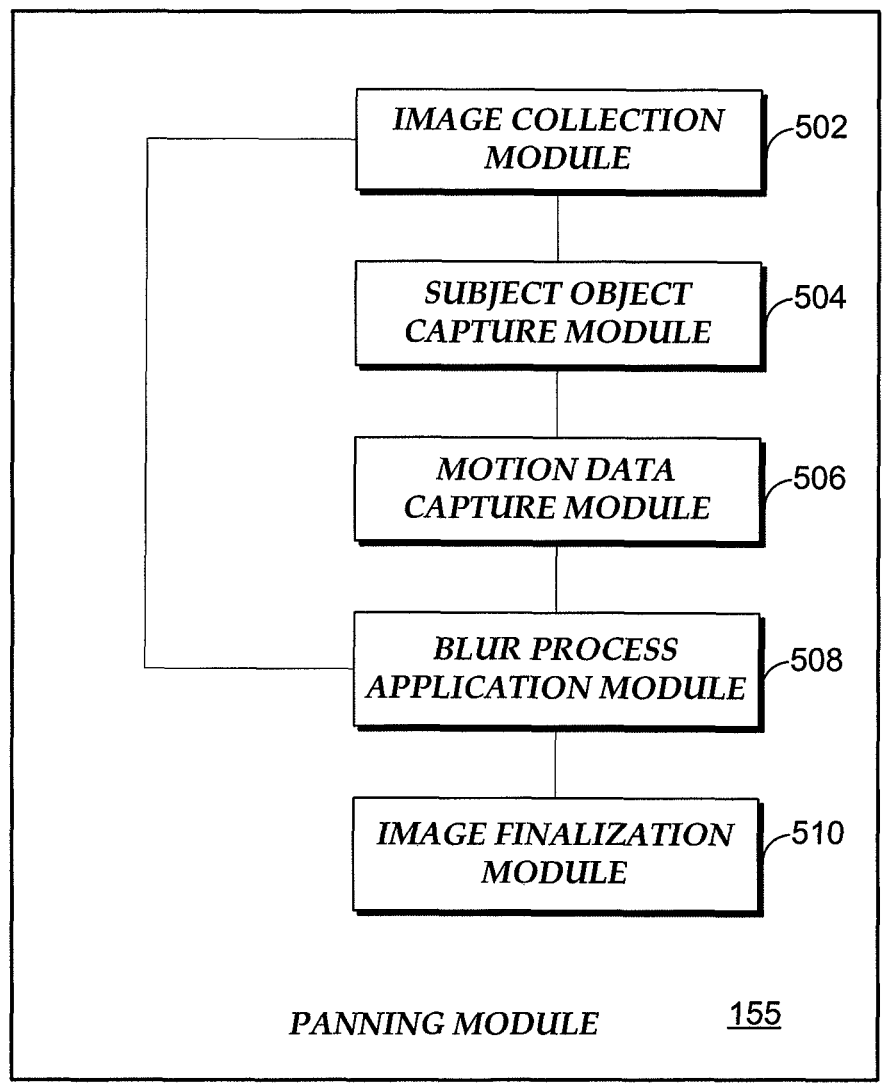
FIG. 5 illustrates a block diagram of a panning module that may be utilized in the image capture device of FIG. 1.

FIG. 5 illustrates a block diagram of a panning module 155 that may be used in the image capture device of FIG. 1. The panning module 155 includes an image collection module 502, subject object capture module 504, motion data capture module 506, blur process application module 508, and image finalization module 510. As described in connection with FIG. 1, each of the modules may be used in connection with a same image processor 120 or different image processors as appropriate for different applications. For example, in certain embodiments each of the modules may be assigned to different image processors, which service the assigned module.

The image collection module 502 may access the initial image and the current image and pass the initial image and the current image to the subject object capture module 504. The subject object capture module 504 may be used to determine the subject object from the initial image or the current image automatically without user input or manually with user input as discussed in further detail in connection with FIG. 3B. For example, the subject object in the current image may be copied and stored in the working memory 105 (FIG. 1). The subject object capture module may identify the subject object to the motion data capture module 506. The motion data capture module 506 may determine motion data based upon an analysis of the differences between different images of the series of images, for example between the current image and the initial image (or differences between the new current image and the previous current image as described in connection with FIGS. 4A-4H) or across more than two images of the series of images, as discussed in connection with FIGS. 4A-4H.

In certain embodiments, the motion data may include a direction value and a magnitude value. The direction value may designate a direction of movement of the subject object between the initial image and the current image (or between the new current image and the previous current image as described in connection with FIGS. 4A-4H). The magnitude value may designate the amount of movement made between the initial image and the current image. The blur process application module 508 may generate a background image by implementing the blur process based upon the captured motion data from the motion data capture module 506. The blur process may be implemented by the overlay process of overlaying and adding the initial image and the current image on each other as discussed in connection with FIGS. 4A-4H. If there is another current image in the series of images, the blur process application module 508 may indicate to the image collection module to designate the new background image as the new initial image and continue processing the new initial image and the new current image, as discussed in block 212 in FIG. 2. If there are no additional current images in the series of images, the background image is passed to the image finalization module, which generates the panning shot by superimposing the subject object over the background image. The location of superimposition may be the location that corresponds to the location of the subject object in the current image (for example the last known location of the subject object within the series of images).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor. A transmission (or communication) means may be used to communicate between two devices. For example, if information is made from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a transmission (or communication) means.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A system, comprising:
   an electronic hardware memory component configured to store a series of images of at least two images of a scene, the series of images including at least one object moving within the scene; and
   at least one hardware processor in communication with the memory component, the at least one hardware processor configured to:
      determine a subject object in the at least two images;
      generate image data depicting the subject object from at least one of the at least two images;
      determine motion data indicating the movement of the subject object by comparing a location of the subject object in a second image of the series of images to a location of the subject object in a first image of the series of images, the second image captured after the first image, the motion data including a magnitude value and a direction value indicating the movement of the subject object between the first image and the second image;
      generate a background image by
         shifting the second image in the direction of the direction value and by magnitude value,
         overlaying the shifted second image over the first image,
         adding the pixel values of the overlayed second image to the pixel values of the first image to form un-normalized pixel values for the background image, and
         normalizing the pixel values of the background image; and
      generate a final image by including the image data depicting the subject object in the background image at the location of the subject object in the second image.

2. The system of claim 1, wherein normalizing the pixel values comprises scaling the background image to a dimension of the second image.

3. The system of claim 1, wherein the normalizing the pixel values comprises dividing each of the pixel values of the background image by two.

4. The system of claim 1, wherein the at least one hardware processor is further configured to:
   in response to having an additional image in the series of images available, repeat said determine motion data and said generate a new background image using the generated background image as the first image and the additional image as the second image.

5. The system of claim 1, wherein the at least one hardware processor is further configured to generate an image of a subject object of the at least one object in motion in the series of images from the second image.

6. The system of claim 1, wherein the at least one hardware processor is further configured to receive a user input and use the user input to identify the subject object.

7. The system of claim 6, wherein the at least one hardware processor is further configured to display at least two objects moving across the scene on a display, and receive a user input to identify which of the at least two objects is the subject object.

8. The system of claim 1, wherein the at least one hardware processor is further configured to determine one of the series of images as a reference image to use to identify the subject object.

9. The system of claim 8, wherein at least one hardware processor is further configured to receive a user input indicting which of the series of images is the reference image.

10. The system of claim 1, further comprising:
    camera module configured to capture the series of images of the scene; and a display configured to display at least two objects moving across the scene.

11. A method for generating a panning shot, comprising:
receiving a series of images of a scene;
generating image data depicting a subject object in motion in the series of images;
storing a portion of an image of the series of images depicting the subject object;
determining motion data indicating the movement of the subject object by comparing a location of the subject object in a second image of the series of images to a location of the subject object in a first image of the series of images, the second image captured after the first image, the motion data including a magnitude value and a direction value indicating the movement of the subject object between the first image and the second image;
generating a background image by
  shifting the second image in the direction of the direction value and by magnitude value,
  overlaying the shifted second image over the first image,
  adding the pixel values of the overlayed second image to the pixel values of the first image to form unnormalized pixel values for the background image, and
  normalizing the pixel values of the background image;
generating a final image by including the image data depicting the subject object in the background image at the location of the subject object in the second image.

12. The method of claim 11, further comprising:
in response to having an additional image in the series of images available, repeat said determining motion data and said generating a new background image, and when repeating determining motion data and generating a new background image, the generated background image is processed as the first image and the additional image is processed as the second image.

13. The method of claim 11, wherein the subject object of the at least one object in motion in the series of images is copied from the second image.

14. The method of claim 11, wherein normalizing the pixel values comprises scaling the background image to a dimension of the second image.

15. The method of claim 11, wherein normalizing the pixel values comprises dividing each of the pixel values of the background image by two.

16. The method of claim 11, wherein a number of pixels with pixel values resulting from the adding of pixel values of the shifted second image to the first image is less than a number of pixels in the second image.

17. A system comprising:
an electronic hardware memory configured to at least store computer-executable instructions; and
a computing device including one or more hardware processors, the computing device in communication with the electronic hardware memory and configured to execute the computer-executable instructions to implement:
an image collection module configured to receive a series of images of a scene, the series of images including at least one object within the scene;
a subject object capture module configured to generate image data depicting a subject object selected from the at least one object,
a motion data capture module configured to determine motion data of the subject object based on the position of the subject object in the series of images,
a blur process application module configured to generate a background image by
determining motion data indicating the movement of the subject object by comparing a location of the subject object in a second image of the series of images to a location of the subject object in a first image of the series of images, the second image captured after the first image, the motion data including a magnitude value and a direction value indicating the movement of the subject object between the first image and the second image;
shifting the second image in the direction of the direction value and by magnitude value,
overlaying the shifted second image over the first image,
adding the pixel values of the overlayed second image to the pixel values of the first image to form pixel values of the background image, and
normalizing the pixel values of the background image;
using the series of images and the motion data, and
an image finalization module configured to generate a final image by including the image data depicting the subject object in the background image at the location of the subject object in the second image.

18. The system of claim 17, wherein the subject object capture module is further configured to receive a user input and use the user input to identify the subject object.

19. The system of claim 18, wherein the subject object capture module is further configured to display at least two objects moving across the scene on a display, and receive a user input to identify which of the at least two objects is the subject object.

20. The system of claim 18, wherein the subject object capture module is further configured to determine one of the series of images as a reference image to use to identify the subject object.

21. The system of claim 20, wherein the subject object capture module is further configured to receive a user input indicting which of the series of images is the reference image.

22. A computer-readable, non-transitory storage medium storing computer executable instructions that, when executed by one or more computer systems, configure the one or more computer systems to perform operations comprising:
receiving a series of images of a scene, the series of images including at least one object within the scene and background information;
generating image data depicting a subject object in motion in the series of images;
storing a portion of an image of the series of images depicting the subject object;
determining motion data of the subject object by comparing the subject object across the series of images;
determining motion data indicating the movement of the subject object by comparing a location of the subject object in a second image of the series of images to a location of the subject object in a first image of the series of images, the second image captured after the first image, the motion data including a magnitude value and a direction value indicating the movement of the subject object between the first image and the second image;
generating a background image by using the series of images and the motion data; and shifting the second image in the direction of the direction value and by magnitude value,
overlaying the shifted second image over the first image,
adding the pixel values of the overlayed second image to the pixel values of the first image to form pixel values for the background image, and
normalizing the pixel values of the background image;
generating a final image by including the image data depicting the subject object in the background image at the location of the subject object in the second image.

23. The computer-readable, non-transitory storage medium of claim 22, wherein the normalizing the pixel values comprises scaling the background image to a size of the second image.

24. The computer-readable, non-transitory storage medium of claim 22, wherein the normalizing the pixel values comprises dividing each of the pixel values of the background image by two.

* * * * *